US009457492B2

(12) United States Patent
Jang

(10) Patent No.: US 9,457,492 B2
(45) Date of Patent: Oct. 4, 2016

(54) ASSEMBLY FOR BLOCKING COOLING WATER CHANNEL IN MOLD

(71) Applicant: Young-hyun Jang, Gwangju (KR)

(72) Inventor: Young-hyun Jang, Gwangju (KR)

( * ) Notice: Subject to any disclaimer, the term of this patent is extended or adjusted under 35 U.S.C. 154(b) by 101 days.

(21) Appl. No.: 14/488,436

(22) Filed: Sep. 17, 2014

(65) Prior Publication Data

US 2016/0040819 A1    Feb. 11, 2016

(30) Foreign Application Priority Data

Aug. 6, 1920    (KR) .................. 10-2014-0101158

(51) Int. Cl.
*F16L 55/10*    (2006.01)
*B29C 33/04*    (2006.01)
*F16L 55/132*    (2006.01)

(52) U.S. Cl.
CPC .............. *B29C 33/04* (2013.01); *F16L 55/132* (2013.01)

(58) Field of Classification Search
CPC ............ F16L 55/1108; F16L 55/1141; F16L 55/128; F16L 55/136
USPC ................................................... 138/89, 90
See application file for complete search history.

(56) References Cited

U.S. PATENT DOCUMENTS

| | | | | | |
|---|---|---|---|---|---|
| 4,381,800 A | * | 5/1983 | Leslie | ...................... | G01N 3/12 138/90 |
| 4,653,540 A | * | 3/1987 | Epstein | .................... | F28F 11/02 138/89 |
| 4,693,278 A | * | 9/1987 | Wilson | .................. | F16L 55/136 138/89 |
| 4,982,763 A | * | 1/1991 | Klahn | ...................... | F28F 11/02 138/89 |
| 5,289,851 A | * | 3/1994 | Jorgensen | ................ | F28F 11/02 138/89 |
| 5,437,309 A | * | 8/1995 | Timmons | .............. | F16L 57/005 138/89 |
| 5,797,431 A | * | 8/1998 | Adams | .................. | F16L 55/136 138/89 |
| 6,003,557 A | * | 12/1999 | Brelig | .................... | F16L 55/136 138/89 |
| 6,981,524 B2 | * | 1/2006 | Jorgensen | ........... | F16L 55/1108 138/89 |
| 9,249,916 B2 | * | 2/2016 | Jorgensen | ........... | F16L 55/1108 |
| 2008/0092970 A1 | * | 4/2008 | Carnevali | ............. | F16L 55/132 138/89 |

FOREIGN PATENT DOCUMENTS

| KR | 10-2002-0034626 A | 5/2002 |
|---|---|---|
| KR | 10-2003-0075014 A | 9/2003 |
| KR | 20-0467581 Y1 | 7/2013 |

\* cited by examiner

*Primary Examiner* — Patrick F Brinson
(74) *Attorney, Agent, or Firm* — Rabin & Berdo, P.C.

(57) ABSTRACT

The present invention relates to an assembly for blocking a cooling water channel in a mold, which includes a bolt with a threaded-shank and a head, a base with a threaded-hole for thread-fastening the thread-shank, and an elastic ring, an elastic ring-fixing member, a pressing ring, an expansion ring, and a seat member which are disposed between the bolt and the base from the base to the bolt. The elastic ring-fixing member has an elastic ring seat holding the inner side of the elastic ring, the inner side of the elastic ring is fitted in the elastic ring seat, a body is made by insert-molding nylon to protect the base with the threaded-hole and composed of an upper cylindrical portion, a lower cylindrical portion larger in outer diameter than the upper cylindrical portion, and a step formed at the joint of the upper and lower cylindrical portions.

10 Claims, 7 Drawing Sheets

ASSEMBLY FOR BLOCKING COOLING WATER CHANNEL IN MOLD

CROSS REFERENCE TO RELATED APPLICATION(S)

This application claims the benefit of Korean Patent Application No. 10-2014-101158, filed on Aug. 6, 2014, which are hereby incorporated by reference in its entirety into this application.

BACKGROUND OF THE INVENTION

1. Field of the Invention

The present invention relates, in general, to an assembly for blocking a cooling water channel in a mold, which hermetically blocks a cooling water channel to stop the flow of cooling water, when switching a cooling water channel in a mold, and which has thermal resistance and durability.

2. Description of the Related Art

In general, cooling water channels are provided for allowing cooling water to flow to cool products made by molds, and in switching of channels for cooling water, as shown in FIG. 1, a channel 10 to stop flow of cooling water in a mold 100 is blocked by an assembly 200 for blocking a cooling water channel and the cooling water is guided to other desired channels 110.

The configuration of the assembly 200 for blocking a cooling water channel having the function described above is shown in FIG. 2 and described in detail hereafter.

A first member 210 with a hole 211 formed through the center is seated at a selected position in the channels 110 in the mold 100 and stop the flow of cooling water and a blocking member 220 is forcibly fitted in the hole 211 of the first member 210 and stops the flow of cooling water.

Since the outer side of the first member 210 is in close contact with the channel 110 and the blocking member 220 is forcibly fitted in the first member 210, the assembly 200 for blocking a cooling water channel having this configuration can stop flow of cooling water.

However, the assembly 200 for blocking a cooling water channel having this configuration has a problem in that it is difficult to completely stop cooling water flowing through the channel under high pressure, because sealing forces between the outer side of the first member 210 and the channel 110 and between the inner side of the first member 210 and the blocking member 220 are not sufficient.

Accordingly, an assembly 200 for blocking a cooling water channel shown in FIG. 3 has been designed and used to solve the problem and is described in detail hereafter.

A first blocking member 230 with a hole 231 having a diameter gradually decreasing from a first side to a second side at the center is seated at a selected position in a channel 110 formed in a mold 100 and stops flow of cooling water, a second blocking member 240 inserted into the hole 231 of the first blocking member 230 from the larger-diameter side toward the smaller-diameter side and blocking the hole 231 is provided, a step 241 is formed at the rear potion of the second blocking member 240, and a sealing member 250 is disposed between an end of the first blocking member 230 and the step 241 of the second blocking member 240.

According to the configuration of the assembly 200 for blocking a cooling water channel, the second blocking member 240 is pushed to the first blocking member 230 and presses the sealing member 250 by the pressure of cooling water and thus cooling water is prevented from leaking by the sealing member 250, but it also has a problem of insufficient sealing ability.

The foregoing is intended merely to aid in the understanding of the background of the present invention, and is not intended to mean that the present invention falls within the purview of the related art that is already known to those skilled in the art.

DOCUMENTS OF RELATED ART (Patent Document 1) Korean Patent Application Publication No. 10-2002-0034626 (2002 May 9);
(Patent Document 2) Korean Patent Application Publication No. 10-2003-0075014 (2003 Sep. 22); and
(Patent Document 3) Korean Utility Model Registration No. 20-0467581 (2013 Jun. 14).

SUMMARY OF THE INVENTION

Accordingly, the present invention has been made keeping in mind the above problems occurring in the related art, and the present invention is intended to propose an assembly for blocking a cooling water channel in a mold, which can hermetically block a cooling water channel to be blocked in a mold, has durability sufficient to resist deformation or damage due to the repeated heating and cooling for the features of a mold, and can be manufactured at a low cost with a minimum configuration and low weight.

In order to achieve the above object, according to one aspect of the present invention, there is provided an assembly for blocking a cooling water channel in a mold, which includes: a bolt with a threaded-shank and a head; a base with a threaded-hole for thread-fastening the thread-shank; and an elastic ring, an elastic ring-fixing member, a pressing ring, an expansion ring, and a seat member which are disposed between the bolt and the base.

The elastic ring-fixing member has an elastic ring seat holding the inner side of the elastic ring, the inner side of the elastic ring is fitted in the elastic ring seat, a body is made by insert-molding nylon to protect the base with the threaded-hole and composed of an upper cylindrical portion, a lower cylindrical portion larger in outer diameter than the upper cylindrical portion, and a step formed at the joint of the upper and lower cylindrical portions.

According to the assembly for blocking a cooling water channel in a mold, it is possible to hermetically block a cooling water channel to be blocked in a mold, to achieve durability sufficient against deformation or damage due to the repeated heating and cooling for the features of a mold, and to manufacture the assembly at a low cost with a minimum configuration and low weight.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Embodiments of an assembly for blocking a cooling water channel in a mold according to the present invention will be described in detail hereafter with reference to the accompanying drawings.

Figure 1:
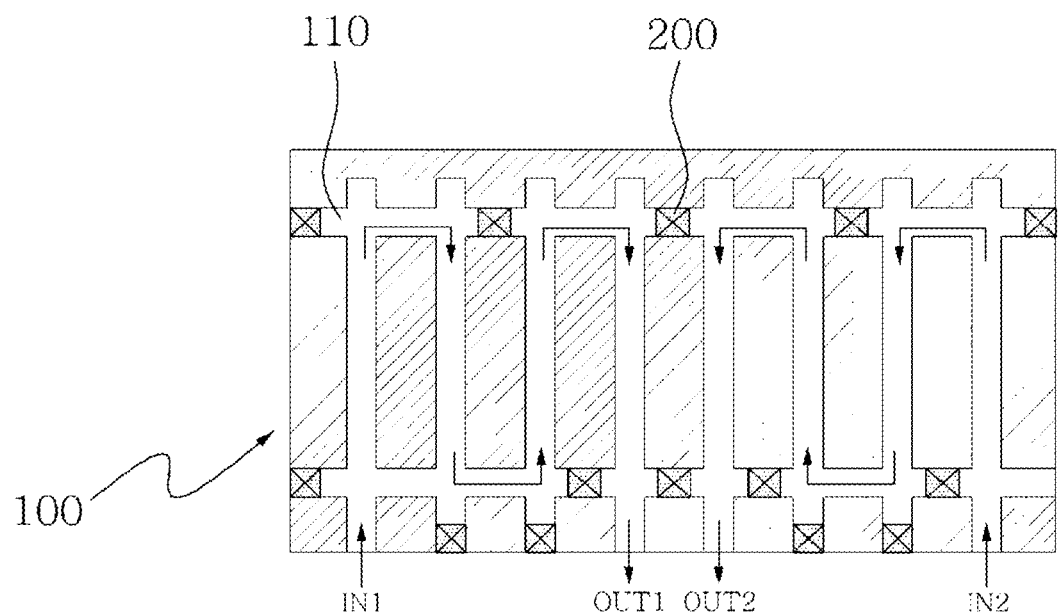
FIG. 1 is a schematic view illustrating cooling water channels in a mold.
Figure 2:
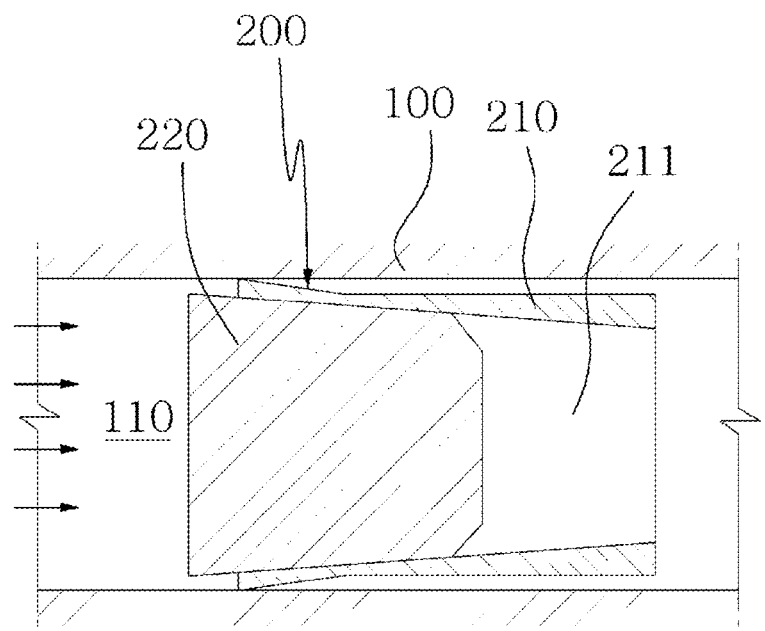
FIG. 2 is a view showing a cross-section of an assembly for blocking a cooling water channel in a mold, according to a first embodiment of the related art.
Figure 3:
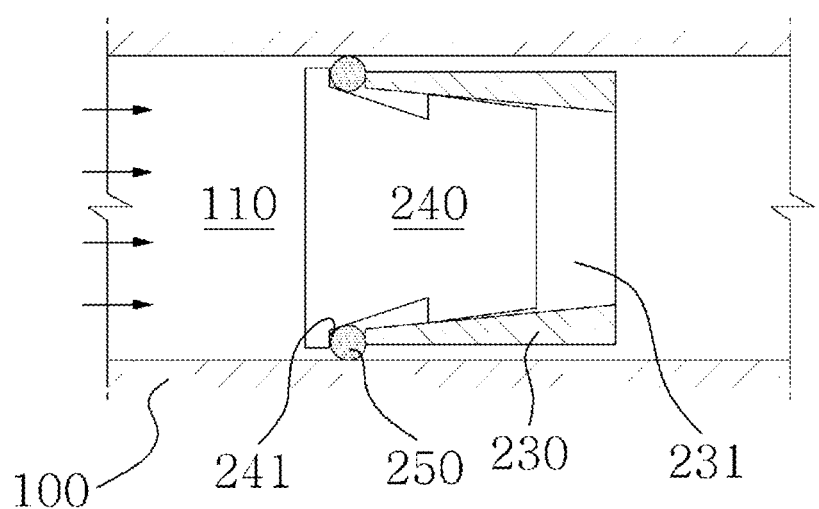
FIG. 3 is a view showing a cross-section of an assembly for blocking a cooling water channel in a mold, according to a second embodiment of the related art.

An assembly for blocking a cooling water channel in a mold according to the present invention can be manufactured at a low cost with chemical resistance, thermal resistance, durability, low weight, and a simple configuration, in addition to hermetically blocking a cooling water channel to stop the flow of cooling water in order to switch a cooling water channel in a mold, as shown in FIG. 1.

Figure 4:
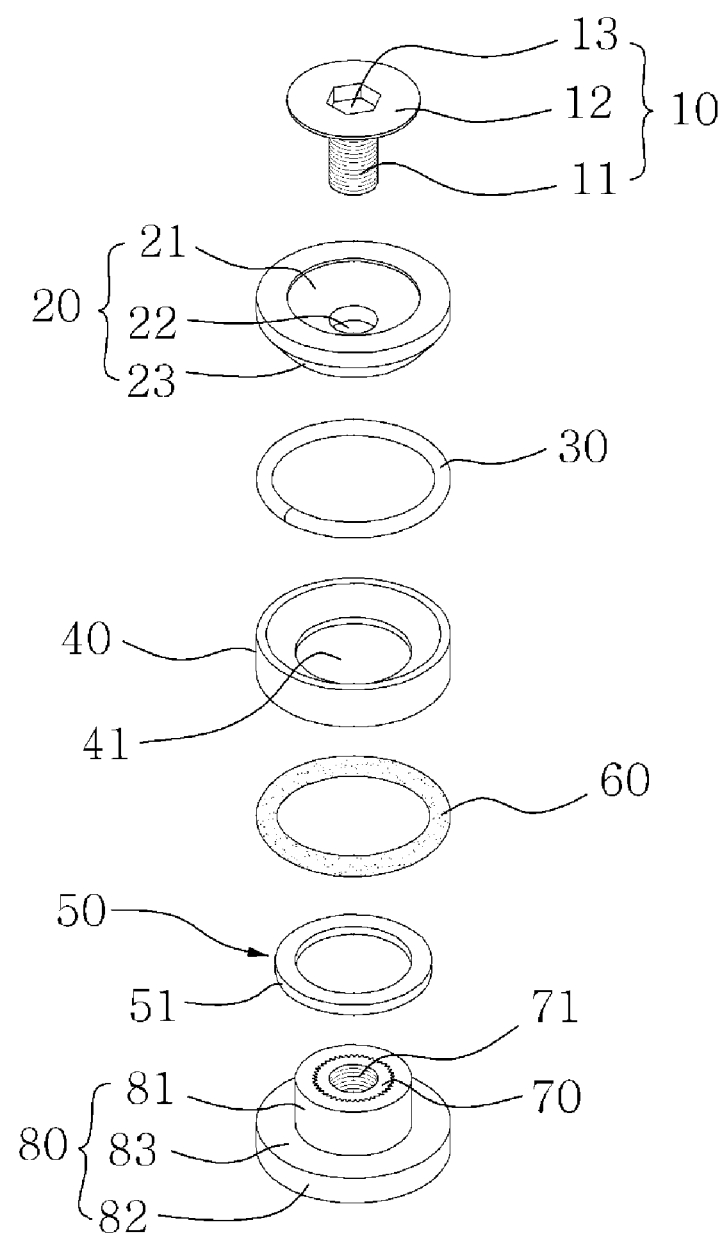
FIG. 4 is an exploded perspective view of an assembly for blocking a cooling water channel in a mold, according to the present invention.
Figure 5:
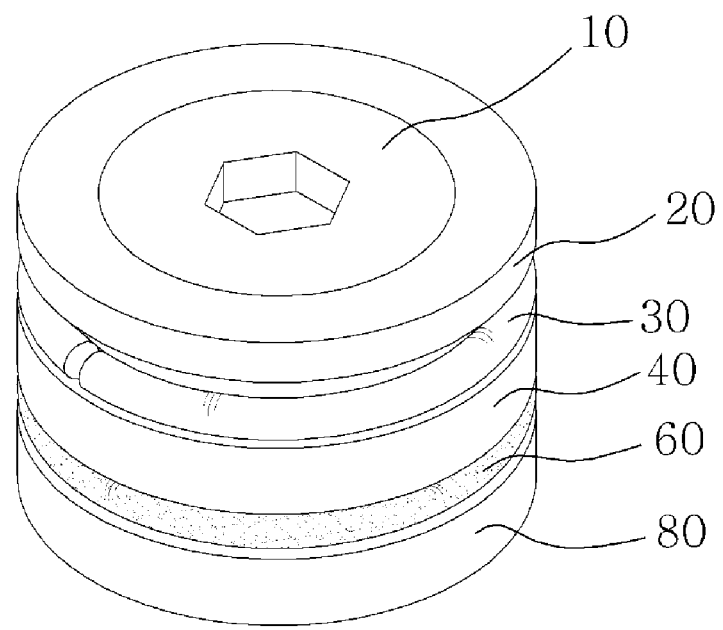
FIG. 5 is an assembly perspective view of the assembly for blocking a cooling water channel in a mold, according the present invention.
Figure 6:
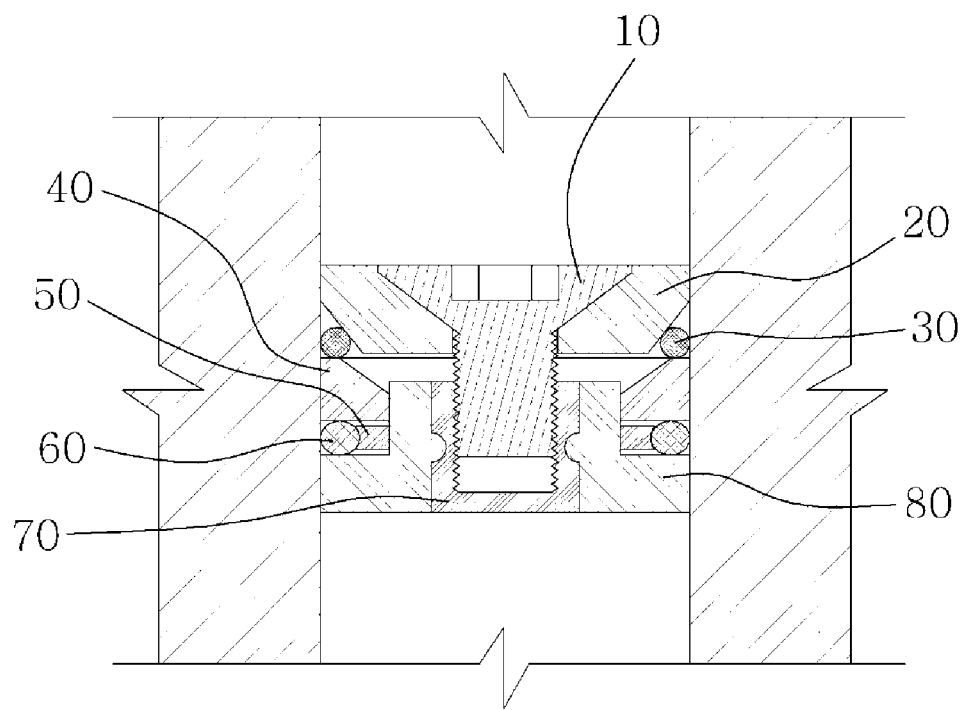
FIG. 6 is a cross-sectional view of the assembly for blocking a cooling water channel in a mold, according to the present invention.

The basic configuration of the assembly, as shown in FIGS. 4 to 6, includes a bolt 10 with a threaded-shank 11 and a head 12, a base 70 with a threaded-hole 71 for thread-fastening the thread-shank, and an elastic ring 60, an elastic ring-fixing member 50, a pressing ring 40, an expansion ring 30, and a seat member 20 which are disposed between the bolt and the base.

In the configuration, the elastic ring-fixing member 50 has an elastic ring seat 51 formed along the outer side to hold the inner side of the elastic ring 60, the inner side of the elastic ring 60 is fitted in the elastic ring seat, a body 80 is made by insert-molding with nylon 66 to protect the base 70 with the threaded-hole 71 and composed of an upper cylindrical portion 81, a lower cylindrical portion 82 larger in outer diameter than the upper cylindrical portion, and a step 83 formed at the joint of the upper and lower cylindrical portions.

In the assembly of the present invention, the bolt 10 with the threaded-shank 11 and the head 12 is thread-fastened to the threaded-hole 71 of the base 70, that is, the bolt 10 is tightened into the threaded-hole 71, with the elastic ring-fixing member 50 combined with the elastic ring 60, the pressing ring 40, the expansion ring 30, and the seat member 20 sequentially stacked between the bolt 10 and the base 70, such that the elastic ring-fixing member 50 combined with the elastic ring 60, the pressing ring 40, the expansion ring 30, and the seat member 20 are fixed in close contact with each other.

A tool hole 13 for turning the bolt 10 may be formed on the head 12.

The assembly of the present invention including the components being in close contact with each other is fitted in a cooling water channel in a mold, as shown in FIGS. 4 to 6, to prevent cooling water from leaking through the cooling water channel in the mold, in which the most important component for preventing the leakage of cooling water is the elastic ring 60 fitted on the elastic ring-fixing member 50.

According to the principle of preventing the leakage of cooling water through a cooling water channel by means of the elastic ring 60, when the bolt 10 is firmly tightened in the threaded-hole 71 of the base 70, the tightening force is transmitted to the seat member 2 and the pressing ring 40 and pressure is applied to the top and the bottom of the elastic ring 60. Accordingly, the elastic ring 60 is pressed toward both sides and brought into close contact with the inner side of a cooling water channel in a mold, such that a sealing ability is improved and cooling water is prevented from leaking.

The elastic ring 60 having the function described above is a circular ring and is fixed to the outer side of the elastic ring-fixing member 50. The shape of the elastic seat 51 will be described below with respect to first to third embodiments.

Figure 7A:
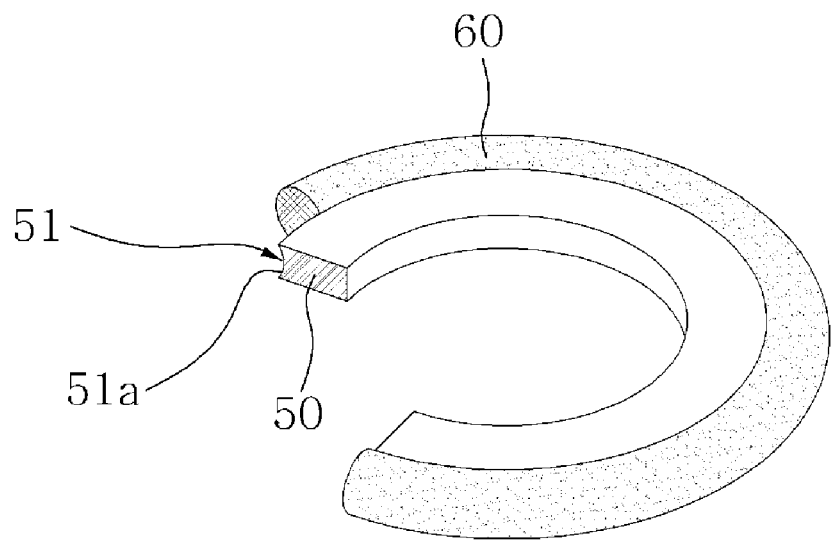
FIGS. 7A to 7C are views an elastic ring combined with an elastic ring-fixing member in the present invention.

According to the configuration of a first embodiment of the elastic ring seat 51, as shown in FIG. 7A, the elastic ring seat 51a is formed in the shape of an arc groove 51a formed along the outer side of the elastic ring-fixing member 50 to fit the inner side of the elastic ring 60, so the inner side of the circular elastic ring 60 is stably and firmly fixed in the arc groove 51a.

Since it is possible to increase the force for sealing a cooling water channel in a mold by combining one elastic ring 60 with one elastic ring-fixing member 50, the elastic ring-fixing member 50 and the elastic ring 60 make it possible to achieve a sealing force the same as or larger than the sealing force obtained by two elastic rings in the related art and to reduce the weight and the manufacturing cost of the assembly for blocking a cooling water channel in a mode of the present invention by reducing the number of parts.

For example, the elastic ring 60 may be made of fluoro rubber (Viton), the reason being that fluoro rubber has excellent thermal resistance, oil resistance, and chemical resistance in comparison to common synthetic rubber, so it can increase the lifespan of the elastic ring.

The material of the elastic ring 60 of the present invention is not limited to fluoro rubber and any synthetic rubber having high thermal resistance, oil resistance, and chemical resistance can be used.

Figure 7B:
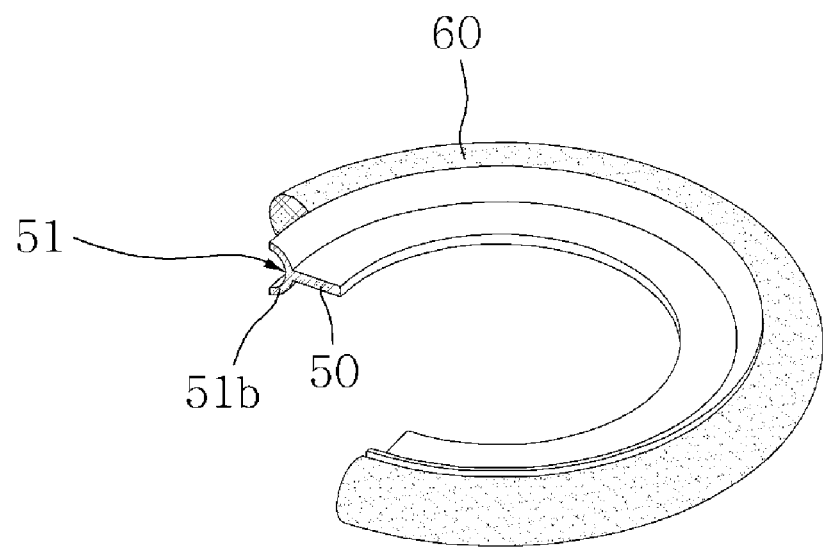

According to the configuration of a second embodiment of the elastic ring seat 51, as shown in FIG. 7B, an arc extension 51b for holding a portion of the inner side of the elastic ring 60 is formed along the outer side of the elastic ring-fixing member 50 and the inner side of the elastic ring 60 is partially fitted in the extension 51b. The function as the elastic ring 60 fitted in the arc extension 51b is the same as that of the first embodiment and a repeated description is not provided.

Figure 7C:
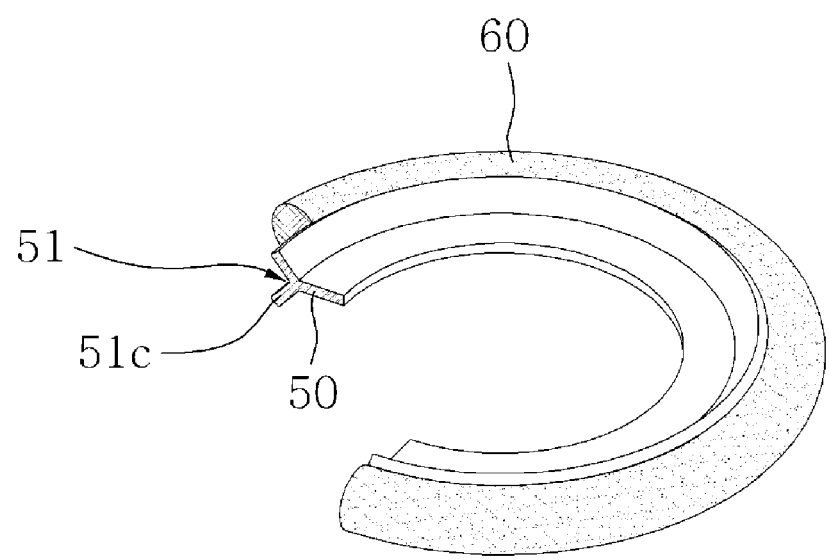
Figure 8:
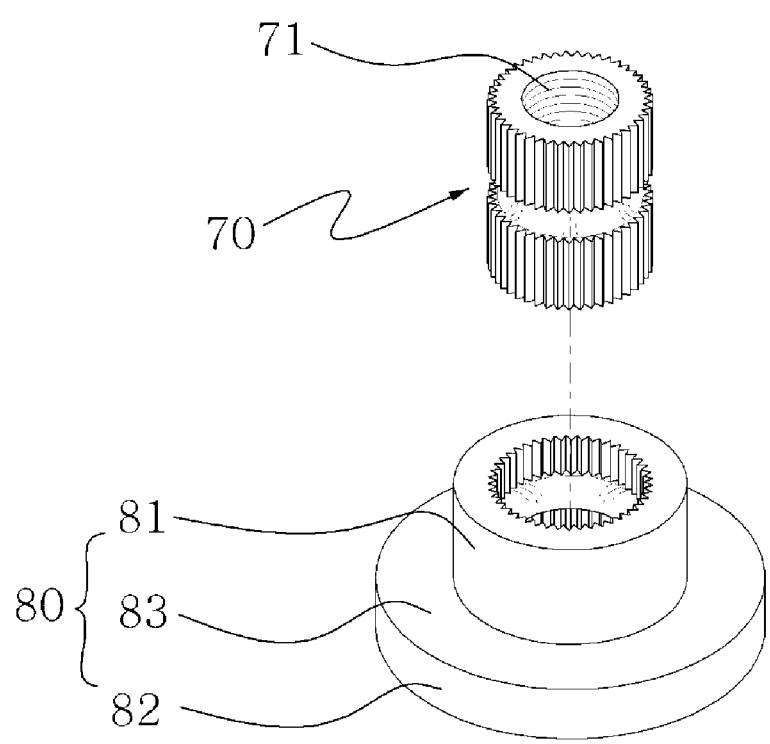
FIG. 8 is a perspective view showing a base separated from a body in the present invention.

According to the configuration of a third embodiment of the elastic ring seat 51, as shown in FIG. 7C, a conical extension 51c for holding a portion of the inner side of the elastic ring 60 is formed along the outer side of the elastic ring-fixing member 50 and the inner side of the elastic ring 60 is partially fitted in the extension 51c. The function as the elastic ring 60 fitted in the conical extension 51c is the same as that of the first embodiment and a repeated description is not provided.

The material of the elastic ring-fixing member 50 combined with the elastic ring 60 may be nylon 66 and copper (Cu), or the elastic ring-fixing member 50 may be made of copper (Cu) and then insert-molded with nylon 66, but it is best to use an elastic ring-fixing member 50 made of nylon 66.

Nylon 66 is used as the material of the elastic ring-fixing member 50 to reduce the weight of the assembly of the present invention and to improve thermal resistance, elastic modulus, friction resistance, chemical resistance, and corrosion resistance, all of which are the properties of nylon 66.

For reference, nylon 66 is produced by dehydration condensation polymerization of hexa methylene diamine and adipoyl chloride.

The seat member 20 of the present invention, as shown in FIG. 4, has a bolt hole 22 through which the threaded-shank 11 of the bolt 10 passes, a head seat 21 receiving the head 12, and a tapered portion 23 having a diameter gradually decreasing from the center to the bottom, in which the head seat 21 is provided for seating the head 12 of the bolt 10 therein without the top of the head 12 exposed over the seat member 20, when the bolt 10 is fully thread-fastened in the threaded-hole 71 of the base 70.

The pressing ring 40, which is disposed under the seat member 20 and presses the elastic ring 60 by transmitting the pressure when the bolt 10 is thread-fastened to the threaded-hole 71 of the base to the elastic ring 60, is formed in a ring shape with a hole 41 from the top to the bottom.

In the pressing ring 40 having this configuration, the top is in contact with the bottom of the seat member 20 and the bottom is in contact with the top of the elastic ring 60.

The expansion ring 30 is disposed around the tapered portion 23 of the seat member 20, so when the outer side of the seat member 20, that is, the tapered portion 23 and the top of the pressing ring 40 are brought in surface contact with each other by the fastening force of the bolt 10, the expansion spring 30 functions as a medium that keeps airtightness between the outer side of the seat member 20 and the top of the pressing ring 40 while being expanded outward by the force applied by the seat member 20.

The expansion spring 30, a metallic spring, may be cut with both cut ends spaced from each other so that it can easily expand, when the pressing ring 40 pushes up the expansion spring 30 on the tapered portion 23 of the seat member 20 while the seat member 20 and the pressing ring 40 are brought in close contact with each other by the fastening force of the bolt 10.

The base 70 is provided with the body 80 formed by insert-molding with nylon 66 to protect the base 70 and the body 80 is composed of the upper cylindrical portion 81 and the lower cylindrical portion 82 larger in outer diameter than the upper cylindrical portion and the step 83 is formed at the joint of the upper and lower cylindrical portions.

Making the body 80 by insert-molding the base 70 with nylon is for reducing the weight of the assembly of the present invention and for improving thermal resistance, elastic modulus, friction resistance, chemical resistance, and corrosion resistance, all of which are properties of nylon 66.

Since a base of the related art is made of copper (Cu), it is expensive and heavy and its sealing ability is poor, so nylon 66 is used in the present invention so that this problem is solved and the lifespan of the base 70 is increased by those properties.

The body 80 made of nylon 66 having this function has the upper cylindrical portion 81, the lower cylindrical portion 82 larger in outer diameter than the upper cylindrical portion, and the step 83 formed at the joint of the upper and lower cylindrical portions.

The elastic ring-fixing member 50, the pressing ring 40, the expansion spring 30, and the seat member 20 are fitted on the upper cylindrical portion 81, the step 83 supports the elastic ring-fixing member 50, the pressing ring 40, the expansion spring 30, and the seat member 20 fitted on the upper cylindrical portion 81, and the lower cylindrical portion 82 supports the elastic ring-fixing member 50, the pressing ring 40, the expansion spring 30, and the seat member 20 fitted on the upper cylindrical portion 81 and supported by the step.

Small prominences and depressions are formed around the outer side of the base 70 I order to increase the molding force after insert-molding with nylon 66.

The outer shapes of the elastic ring 60 combined with the elastic ring-fixing member 50, the pressing ring 40, the seat member 20, and the body 80 have only to be similar to the shape of a cooling water channel in a mold, in a size that can be hermetically fitted in the cooling water channel in a mold, and the sizes of the inner diameter of the elastic ring-fixing member 50 and the hole 41 of the pressing ring 40 have only to be sized such that they fit on the upper cylindrical portion 81 of the body 80.

An assembly for blocking a cooling water channel in a mold according to the present invention can be manufactured at a low cost with chemical resistance, thermal resistance, durability, low weight, and a simple configuration, in addition to hermetically blocking a cooling water channel to stop the flow of cooling water in order to switch a cooling water channel in a mold.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An assembly for blocking a cooling water channel in a mold, comprising:
   a body made by insert-molding with nylon66 and having an upper cylindrical portion,
      a lower cylindrical portion having an outer diameter larger than that of the upper cylindrical portion,
      a step formed at a joint of the upper and lower cylindrical portions, and
      a body threaded-hole in a center portion;
   a base inserted into the body threaded-hole of the body and having a base threaded-hole in a center portion of the base;
   a bolt with a threaded-shank and a head, wherein the threaded-shank is thread-fastened in the base threaded-hole of the base;
   an elastic ring having a ring shape and surrounding the upper cylindrical portion of the body;
   an elastic ring-fixing member disposed between the upper cylindrical portion of the body and the elastic ring for fixing the elastic ring;
   a pressing ring coupled to the upper cylindrical portion of the body such that an inner surface of the pressing ring contacts with an outer surface of the upper cylindrical portion of the body;
   a seat member coupled to the bolt between the head of the bolt and the base; and
   an expansion ring disposed between the seat member and the pressing ring,
   wherein the elastic ring-fixing member has an elastic ring seat formed along an outer side to hold an inner side of the elastic ring, and an inner side of the elastic ring is fitted in the elastic ring seat.

2. The assembly of claim 1, wherein the outer side of the elastic ring seat has an arc groove shape.

3. The assembly of claim 1, wherein the outer side of the elastic ring seat has an arc extension shape.

4. The assembly of claim 1, wherein the outer side of the elastic ring seat has a conical extension shape.

5. The assembly of claim 1, wherein the bolt has a tool hole formed in a center portion of the head thereof for turning the bolt.

6. The assembly of claim 1, wherein the seat member has a bolt hole through which the threaded-shank of the bolt passes, a head seat receiving the head, and a tapered portion having a diameter gradually decreasing from a center to a bottom.

7. The assembly of claim 1, wherein the expansion ring is a metallic spring cut with both cut ends spaced from each other.

8. The assembly of claim 1, wherein the pressing ring has a hole formed from a top to a bottom.

9. The assembly of claim 1, wherein the elastic ring is made of fluoro rubber.

10. The assembly of claim 1, wherein the base has small prominences and depressions around its outer side.

* * * * *